United States Patent Office 3,661,858
Patented May 9, 1972

3,661,858
REDUCING POLYESTER REACTOR SCALE
Clyde E. Gleim, Akron, and James A. Mally, Cuyahoga Falls, Ohio, assignors to The Goodyear Tire & Rubber Company, Akron, Ohio
No Drawing. Filed Oct. 2, 1969, Ser. No. 863,341
Int. Cl. C08g 17/013
U.S. Cl. 260—75 R    12 Claims

ABSTRACT OF THE DISCLOSURE

During the alcoholysis step in producing polyesters reactor scale and catalyst precipitation are reduced by using a phosphorous-free manganese octoate or phosphorous-free manganese 2-ethyl hexoate catalyst, or by the addition of free octonoic acid and/or 2-ethyl hexanoic acid to the reactor.

This invention relates to the preparation of polyesters with minimum reactor scale and catalyst precipitation. It is accomplished by using a phosphorous-free manganese octoate or phosphorous-free manganese 2-ethyl hexoate catalyst, or by the addition of free octonoic acid and/or free 2-ethyl hexanoic acid to the reactor.

Another object of the invention is to reduce polyester reactor scale.

Another object of the invention is to minimize catalyst precipitation.

Still another object is to improve monomer and low molecular weight polymer filter life. Another object is to produce polymer of improved quality with minimum of insolubles. Insoluble residues (reactor scale) from catalyst precipitation, pigment agglomeration, side reaction products, complexing reactions, etc. are objectionable in the production of high quality polymer for making films, fibers and other useful products. These large insoluble particles will cause fiber spinning and drawing problems, faults in film for packaging use and for electrical and tape manufacture and therefore must be filtered out. Short filter life of micrometallic filter units means frequent filter changes, filter cleanings and reinstallations. Reactor scale buildup necessitates frequent reactor shutdown and cleanouts, resulting in a loss of production, and an increase in maintenance costs.

The foregoing objects of the invention are realized by the use of phosphorous-free manganese octasol catalyst system and by the addition of free octonoic acid or 2-ethyl hexanoic acid to the manganese octasol catalyst solution. Manganese octasol is a trade name for manganous octoate or manganese 2-ethyl hexoate dissolved in a high boiling hydrocarbon, such as Shell Oil Company's 83001 mineral spirits. A phosphorous type stabilizer, such as triphenyl phosphite, is used frequently in grades of commercial manganese octasol for benefit of the paint industry. We found that phosphorous compounds under certain conditions will form insoluble precipitates with manganese catalysts and with some polyester reaction materials and by-products. We discovered that the use of a phosphorous-free manganese octasol catalyst for transesterification greatly extended the filter life of a pilot reactor unit over that obtained with phosphorous-containing catalyst. The amount of material that could be filtered through a 20 micron pore size micrometallic stainless steel filter unit before excessive pressure buildup (i.e. 20 lbs. gauge pressure for more than one minute) is a measure of filter life. The filters had to be replaced by a clean one when the above pressure conditions were reached.

We also found that the manganese octasol catalyst solutions were acidic (Acid No. in 12 to 15 range) due to presence of some free octoic or 2-ethyl hexanoic acid. We discovered that by further addition of free acid to increase the acidity up to an Acid No. of about 30 that the filter life was appreciably extended.

The polyesters useful in accordance with the present invention are cold-drawing, linear, highly polymerized esters of terephthalic acid and glycols of the formula $HO(CH_2)_nOH$, where $n$ is an integer of from 2 to 10. The copolyesters used in this invention may comprise ethylene terephthalate-ethylene isophthalate copolymers more fully described hereinafter.

In producing polyalkylene terephthalates there is involved the interaction of at least about two molecular proportions of at least one glycol (preferably ethylene glycol) per molecular proportion of terephthalic acid with the splitting out of water. Subsequent heating of the resulting glycol ester of terephthalic acid at about 250° to 280° C. under 0.05 to 2 millimeters of mercury pressure absolute results in the production of high polymer with the splitting out of glycol which is removed from the reaction mixture.

The esterification reaction is preferably catalyzed in the preparation of the bisglycol terephthalates or their oligomers. The manganese catalyst systems of our invention as well as titanium and zirconium compounds are useful catalysts. The polycondensation is preferably effected in the presence of an antimony compound, such as antimony trioxide. The aliphatic carboxylic acids of our invention are useful in reducing the insoluble residues formed during the preparation of the polyesters.

Highly polymeric polyalkylene terephthalates, useful for the purposes of the invention, may also be produced by heating terephthalic acid bodies, such as ester forming derivatives of terephthalic acid with at least one glycol. Suitable ester forming derivatives are aliphatic or aromatic esters of terephthalic acid such as $C_1$ to $C_4$ alkyl esters and/or aryl esters such as those from phenol, cresols and the like. The preferred derivative is methyl terephthalate.

In this procedure first there is a transesterification reaction (or ester interchange reaction) to low polymer at about 175° to 230° C. for 0.5 to 3.0 hours with the evolution of alcohol. Subsequently, upon heating at about 250° C. to 280° C. under 0.05 to 2 millimeters of mercury absolute pressure there is a polycondensation reaction for 0.5 to 3.0 hours to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is also within the scope of the invention and is along lines previously described. It is described in detail in U.S. Pat. 2,965,613 to Milone et al.

Other linear aromatic polyester resins useful for the purposes of the invention include, among others, not only polyethylene terephthalate and copolyesters of ethylene terephthalate and ethylene isophthalate, but also such polyesters as those of cyclohexane dimethylol terephthalate, polyethylene-2,6-naphthalate and copolyesters of terephthalic acid which contain at least 60 mol percent of terephthalic acid. Also, copolyesters may be derived from a glycol, terephthalic acid and dimer acid as disclosed in U.S. Pat. 3,390,108 to Keck et al. Also, copolyesters may be derived from glycols or mixture of glycols containing 2 to 12 carbon atoms and dibasic acids.

EXAMPLE 1 (BATCH 1)

Production of polyethylene terephthalate/phenylindanate 95/5 copolyesters, 100 pound batch size 91.9 pounds dimethyl terephthalate, 65.1 pounds ethylene glycol and 56.5 grams manganese octasol (6.0% Mn)

(0.0076% Mn based on 100 lbs. ester weight); phosphorous content 0.12% by X-ray fluorescence analysis, was added to a stainless steel glycolysis reactor preheated to 150° C. The transesterification reaction started at about 145° C. and when the temperature reached 210° C. (about 2 hours) the reaction material was transferred to a second stainless steel reactor through a micrometallic porous stainless steel filter (20 micron pore size) using around 10 pounds nitrogen pressure. Transfer time for essentially insoluble-free material is around one minute.

Just after transfer to the second vessel, 513 grams of titanium dioxide dispersed in ethylene glycol (ca. 20% $TiO_2$ solids) is added. After 10 minutes 18.1 grams of triphenyl phosphite stabilizer is added, and after another 10 minutes 8.1 pounds of phenylindane dicarboxylic acid (Amoco Chemical Co.) is added and the esterification and transesterification reactions completed during an 80 to 90 minute period while the temperature is allowed to increase from 210° to 230° C. Then 0.025% powdered antimony metal (based on 100 lbs. ester weight), dispersed in ethylene glycol, (715 ml.) is added along with 12.0 grams of blue pigment toner and 4.06 g. violet pigment toner.

The temperature of the reaction mixture is now gradually raised from around 230° C. to 250° C. over a one hour period as the pressure is gradually reduced to about 20 mm. Hg pressure. The resulting low polymer material is then transferred to a stainless steel polymerization vessel where polycondensation is effected at temperature of 268° to 270° C. and 0.1 to 2.0 mm. Hg pressure for 2.5 hours to yield a copolyester with an intrinsic viscosity of 0.623, measured in a 60/40 phenol/s-tetrachloroethane solution at 30° C.

Subsequent batches were run exactly the same way as described in Example 1 (Batch 1). Only three batches could be filtered through the filter unit before excessive pressure (greater than 20 lbs. nitrogen gauge pressure for a period of one minute) buildup occurred, necessitating a change to another clean filter unit.

EXAMPLE 2

100 pound batch size of the sample copolyester composition was run under identical conditions as described in Example 1 (Batch 1) above except that a phosphorous-free grade manganese octasol was used. Twenty-one batches were transferred through the same filter unit before pressure buildup necessitated a change to a clean filter. This illustrates the improvement in filter life by the use of phosphorous-free manganese octasol. This also illustrates the improvement in polymer quality by reduction of polymer insolubles. The more insolubles present the faster the filter will plug.

EXAMPLE 3

When another lot of manganese octasol containing 0.12% phosphorous was used, only 2 batches could be transferred through the filter unit before the filter needed changing. Another clean filter was installed and only four batches could be filtered before pressure buildup again, requiring still another filter change. These runs show the adverse effect on filter life from using manganese octasol containing phosphorous in comparison to runs made (Example 2) with manganese octasol which was phosphorous-free.

EXAMPLE 4

This example illustrates the preparation of polyethylene terephthalate polymer using manganese octasol containing 0.12% P (X-ray fluorescence).

One hundred pounds dimethyl terephthalate, 65.1 pounds ethylene glycol and 56.5 grams manganese octasol (6% Mn) (0.0076% Mn based on DMT wt.; P-content 0.12%) was added to the glycolysis reactor and the transesterification and polycondensation reactions runs as described in Example 1, except no $TiO_2$ pigment, phenylindane dicarboxylic acid or toners were used. Polymerization reaction time was 100 minutes to yield a 0.600 IV polyethylene terephthalate polymer, differential thermal analysis (DTA) melting point 256° C. Only eight batches could be transferred through a clean filter unit before pressure buildup necessitated a filter change.

EXAMPLE 5

Example 4 was repeated except that 2-ethyl hexanoic acid was added to the manganese octasol containing 0.12% P (X-ray fluorescence) to increase the Acid No. from about 15 to about 30. The amount of 2-ethyl hexanoic acid used in this series of runs was 0.437 gram per gram of manganese octasol. Starting with a clean filter, 16 batches were transferred through the filter without any appreciable difficulty. Since the filter life appeared to be more than doubled by the addition of the acid, the evaluation was discontinued.

EXAMPLE 6

Example 5 was repeated except that n-octanoic acid was used instead of 2-ethyl hexanoic acid. Again the filter life was more than double that experienced in Example 4.

These examples, summarized in Table I, illustrate our invention using phosphorous-free manganese octasol to improve filter life and to reduce insolubles in the polymer and also the use of an aliphatic acid to increase the acidity of the manganese salt containing a phosphorous-stabilizer to improve the filter life.

TABLE I
Effect of Phosphorous Stabilizer in Manganese Carboxylate Catalyst on Filter Life

| Polyester composition | Transesterification catalyst—conc. used—0.0076% Mn, based on 100 lb. ester wt. | No. runs * |
|---|---|---|
| Polyethylene terephthalate/phenylindanate (95/5) | Manganese octasol (6% Mn) (0.12% P by X-ray fluorescence) | 3 |
| Do | Manganese octasol (6% Mn) phosphorous free | 21 |
| Do | Manganese octasol (6% Mn) (0.12% P by X-ray fluorescence) | 2 |
| Polyethylene terephthalate | Manganese octasol (6% Mn) (0.12% P by X-ray fluorescence) | 8 |
| Do | Manganese octasol (6% Mn) (0.12% P by X-ray fluorescence) plus 0.437 g./g. Mn octasol of 2-ethyl hexanoic acid. | >16 |
| Do | Manganese octasol (6% Mn) (0.12% P by X-ray fluorescence plus 0.437 g./g. Mn octasol of n-octanoic acid (caprylic). | >16 |

*Transferred through filter unit (20 micron pore size) before needing replaced.

Although these examples show the invention, other manganese salts of aliphatic acids may be used as transesterification catalysts instead of manganese octasol, such as Mn salts of aliphatic acids containing 1 to 12 carbon atoms. Mn octasol (phosphorous-free) is the preferred catalyst.

Also, other aliphatic acids containing from 1 to 12 carbon atoms may be added to the manganese salts of aliphatic carboxylic acids with or without a phosphorous-type stabilizer instead of octanoic acid or 2-ethyl hexanoic acid to reduce insolubles and to improve filter life. Some examples are formic, acetic, propionic, butyric, valeric acid, caproic acid, and capric acid. The preferred aliphatic carboxylic acids are octanoic (caprylic) and 2-ethyl hexanoic acids. The concentration of aliphatic carboxylic acid can be varied from 0.1 gram per gram of Mn carboxylate to 5 grams per gram of Mn carboxylate, with the preferred range being around 0.3 gram to 1.0 gram per gram of Mn carboxylate. The phosphorous content of the phosphorous-stabilized Mn carboxylate can range up to 0.3% P by X-ray fluorescence analysis providing that adequate carboxylic acid is added in conjunction with the Mn catalyst to practice the invention. Preferably the phosphorous-content of the phosphorous-stabilized Mn carboxylate should be no greater than 0.15% phosphorous.

Polycondensation catalysts other than Sb can be employed if desired, such as Ge salts or oxides, Ti compounds, lead compounds, etc. Other polyesters such as ethylene naphthalate, tetramethylene terephthalate, cyclohexane-dimethanol terephthalate, etc. can be prepared through the use of this invention as well as the copolyesters mentioned hereinbefore.

Resort may be had to modifications and variations of the disclosed embodiments without departing from the spirit of the invention or the scope of the appended claims.

What is claimed is:

1. A process for reducing insolubles in linear aromatic polyesters of terephthalic acid and glycols of the formula $HO(CH_2)_nOH$ where $n$ is an integer from 2 to 10 and copolyesters which contain at least 60 mol percent of terephthalic acid prepared by conducting an ester interchange reaction employing an ester interchange catalyst consisting essentially of a manganese salt of an aliphatic acid containing from 1 to 12 carbon atoms and subsequently condensing the ester interchange product to form high molecular weight polymeric polyester resin, the improvement which comprises adding an aliphatic acid containing from 1 to 12 carbon atoms to said manganese ester interchange catalyst to increase the acid number of said catalyst up to about 30 prior to carrying out said ester interchange reaction.

2. A process in accordance with claim 1 in which said carboxylate catalyst comprises manganese octoate.

3. A process in accordance with claim 1 in which said carboxylate catalyst comprises manganese 2-ethyl hexoate.

4. The process of claim 1 in which the aliphatic acid is octanoic acid.

5. The process of claim 1 in which the aliphatic acid is 2-ethyl hexanoic acid.

6. The process of claim 1 in which the polyester is a copolyester.

7. The process of claim 1 in which the polyester is a copolyester of ethylene terephthalate and ethylene isophthalate.

8. The process of claim 1 in which the polyester is polyethylene terephthalate.

9. The process of claim 1 in which the polyester is a copolyester of at least one glycol, terephthalic acid and a dimer acid.

10. The process of claim 1 in which the polyester is poly(1,4-cyclohexane dimethylene) terephthalate.

11. The process of claim 1 in which the polyester is a copolyester of ethylene terephthalate and phenylindanate.

12. A process for preparing linear aromatic polyesters of terephthalic acid and glycol of the formula $$HO(CH_2)_nOH$$

where $n$ is an integer from 2 to 10 and copolyesters which contain at least 60 mol percent of terephthalic acid prepared by the steps of (1) heating ester forming derivatives of terephthalic acid selected from the group consisting of $C_1$ to $C_4$ alkyl esters of terephthalic acid with at least one glycol of the above formula in the presence of an ester interchange catalyst consisting essentially of a manganese salt of an aliphatic acid containing from 1 to 12 carbon atoms and (2) subsequently heating the reaction product of step (1) at 250° to 280° C. at 0.05 to 2 millimeters of mercury pressure the improvement which comprises adding to the manganese ester interchange catalyst in step (1) from 0.1 to 5.0 grams of an aliphatic acid containing from 1 to 12 carbon atoms per gram of said manganese ester interchange catalyst to increase the acid number of said catalyst up to about 30 prior to carrying out the ester interchange reaction of step (1).

References Cited
UNITED STATES PATENTS

| | | | |
|---|---|---|---|
| 2,461,920 | 2/1949 | Pratt | 260—76 |
| 2,500,222 | 3/1950 | Weaver et al. | 260—76 X |
| 2,857,363 | 10/1958 | Easley | 260—75 |
| 2,951,060 | 8/1960 | Billica | 260—75 |
| 2,954,355 | 9/1960 | Young et al. | 260—75 X |
| 3,033,822 | 5/1962 | Kibler et al. | 260—47 |
| 3,055,869 | 9/1962 | Wilson et al. | 260—75 |
| 3,070,575 | 12/1962 | Cramer | 260—75 |
| 3,390,108 | 6/1968 | Keck | 260—22 (M)X |
| 3,385,830 | 5/1968 | Uom Orde et al. | 260—75 |
| 3,446,763 | 5/1969 | Okuzumi | 260—22 (M) |

MELVIN GOLDSTEIN, Primary Examiner

U.S. Cl. X.R.

260—22 CA, 76, 475 P